April 4, 1950  C. R. FRITZ  2,503,106
VEHICLE

Filed Dec. 10, 1947  2 Sheets-Sheet 1

Clifford R. Fritz
INVENTOR.

BY Clarence A. O'Brien
and Harvey B. Jacobson
Attorneys

April 4, 1950     C. R. FRITZ     2,503,106
VEHICLE

Filed Dec. 10, 1947     2 Sheets-Sheet 2

Inventor
Clifford R. Fritz

By *Clarence A. O'Brien and Harvey B. Jacobson*
Attorneys

Patented Apr. 4, 1950

2,503,106

UNITED STATES PATENT OFFICE 2,503,106

VEHICLE

Clifford R. Fritz, Milwaukee, Wis.

Application December 10, 1947, Serial No. 790,906

2 Claims. (Cl. 180—32)

This invention appertains to novel and useful improvements in vehicles and vehicle construction.

An object of this invention is to provide a front wheel tricycle of the mechanically actuated, internal combustion engine type with improved means for connecting a front and rear assemblage.

Another object of this invention is to provide a vehicle with improved means for connecting the front and rear assemblage, said means being resilient and an improved arrangement of shock absorbing means associated with the resilient means.

Another object of this invention is to provide an improved vehicle, capable of smoother and more efficient riding qualities.

Another purpose of this invention is to provide an extremely inexpensive device of the character described.

Ancillary objects and features of novelty will become apparent to those skilled in the art in following the description of the preferred form of the invention, illustrated in the accompanying drawings, wherein.

This invention has been developed to provide a device for more efficaciously connecting the front and rear assemblage of a three point ground contact vehicle. Simplicity is achieved by the present invention, the utility thereof obviating coil springs which are objectionable in motorcycles, threepoint ground contact vehicles, such as illustrated, and the like.

A front assemblage generally indicated at 10 is provided and the back assemblage generally indicated at 12 is provided with improved means for connecting the two assemblages. The specific connecting means may be seen as a substantially S-shaped resilient leaf spring 14 having aperture 16 at one end thereof and aperture 18 at the other end thereof.

Figure 1:
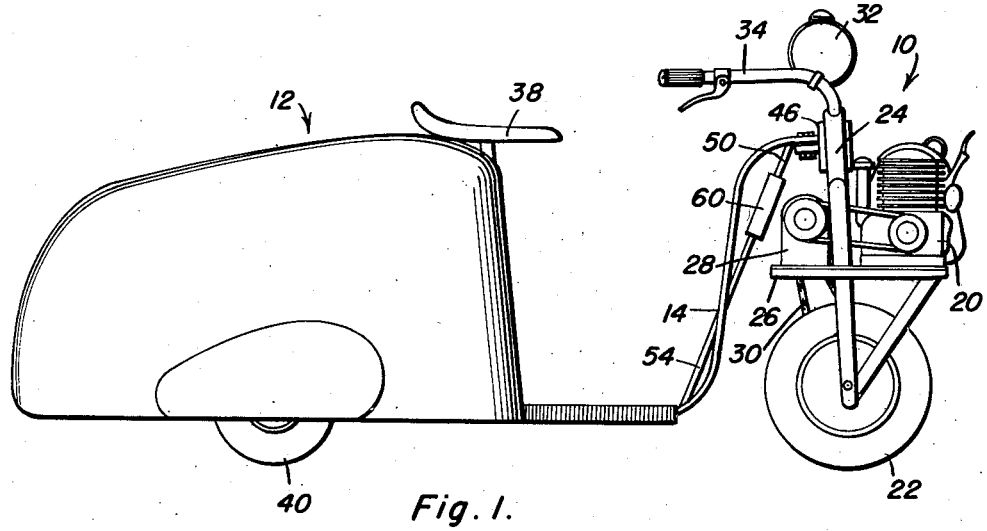
Figure 1 is an elevational side view of the preferred form of the invention.
Figure 2:
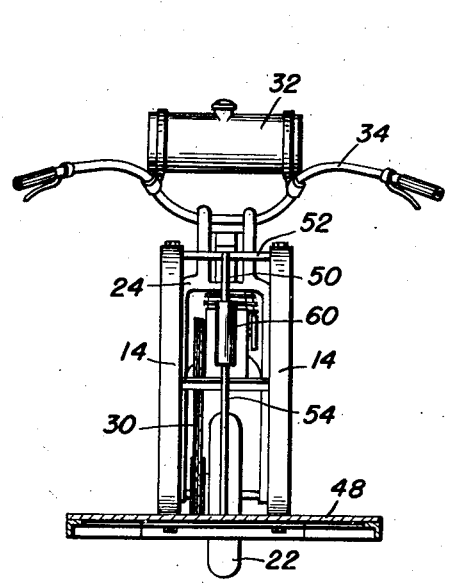
Figure 2 is a front view of the invention as shown in Figure 1, portions being shown in the section to illustrate details of construction.
Figure 3:
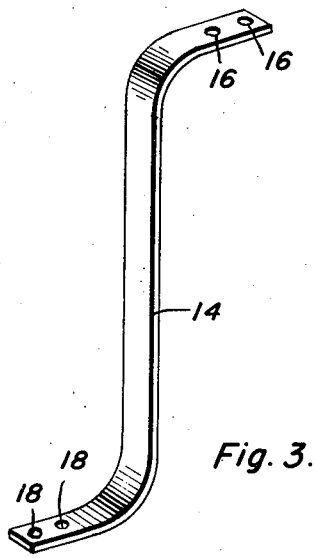
Figure 3 is a perspective view of the resilient connecting means utilized in association forming a part of the present invention.
Figure 4:
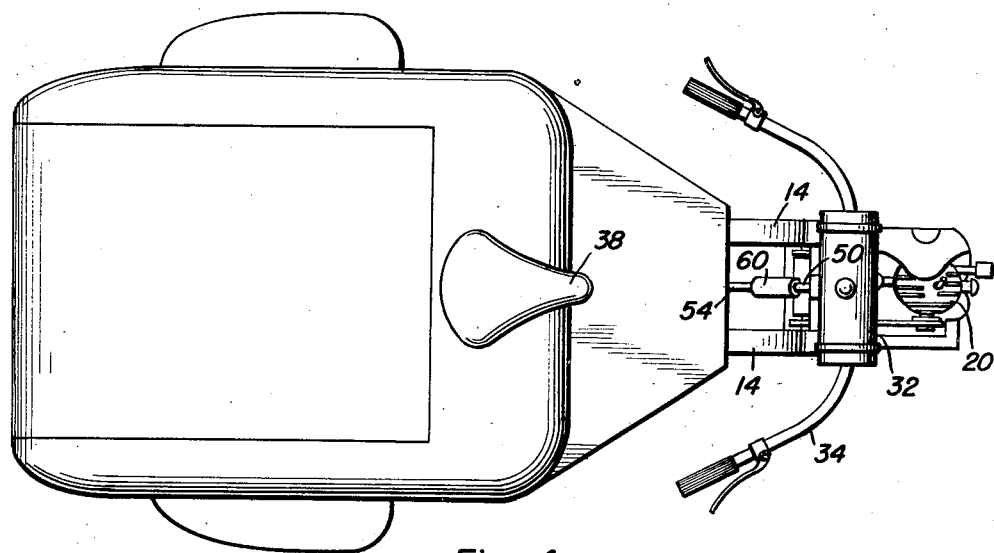
Figure 4 is a plan view of the invention as shown in Figure 1.
Figure 5:
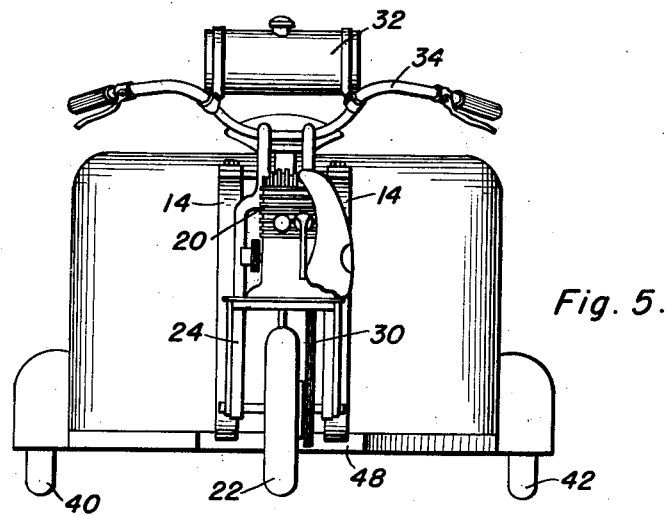
Figure 5 is a front view of the invention as shown in Figure 4.

The front assemblage includes an internal combustion engine generally indicated at 20 and a single driver and steering wheel 22 positioned between the bifurcations of the fork 24. A suitable support platform 26 is secured to the fork for the purpose of seating the internal combustion engine 20 and a transmission 28 thereon. A chain or the like 30 extends from the transmission to a suitable driving gear (unnumbered) attached to the driving wheel 22. This of course actuates the vehicle and as is clearly evident from an inspection of Figure 4 a fuel tank 32 may be supplied on the handlebars 34 for the purpose of maintaining a supply of fuel.

The rear assemblage contains a conventional seat 38 and a storage compartment. Of course, the rear assemblage may simply be of a single wheel and frame construction obviating the storage compartment, however the preferred use of the invention is in association with a dual wheel construction, which wheels are illustrated at 40 and 42 respectively. The rear wheels in the said rear assemblage 12 are idlers and contain nothing more than conventional brakes. Of course, they are journalled by any suitable, conventional means such as a pair of axles having suitable bearings associated therewith.

Secured to a bearing 46 which journals the said fork 24 is a pair of spring elements or leaves 14. Bolts may be utilized in this connection, extending through the apertures 16. The spring 14 then curves and is attached to a suitable framing member 48 at the lower portion of the rear assemblage 12. In this connection suitable bolts may also be utilized in order to render the spring easily assembled in the mechanism and easily detached, if found necessary.

A rod 50 is secured to a suitable cross member 52 whereon the springs 14 actually seat and a second rod 54 is secured to the rear assemblage frame member 48. A conventional shock absorber or shock absorbing means 60 is interposed between the said rods 54 and 56 to serve its usual, conventional function of decreasing shock in operation of the vehicle.

Due to the supreme simplicity achieved by the present invention, a further description thereof is deemed unnecessary. However, it is apparent that variations may be made without departing from the spirit of the invention. Accordingly, limitation is sought only in accordance with the scope of the following claims.

Having described the invention, what is claimed as new is:

1. A vehicle comprising a front assemblage including a motor and drive mechanism, a rear assemblage including idler wheels, means for resiliently securing the front assemblage to the rear assemblage, a rod secured to the front assemblage, a rod secured to the rear assemblage in alignment with the first-mentioned rod, shock absorbing means connecting said rods, and said resilient securing means including a leaf spring of substantially S-shaped configuration fixed at its ends to said assemblages.

2. A vehicle comprising a front assemblage including a motor and drive mechanism, a rear assemblage including idler wheels, means comprising a pair of single leaf springs resiliently securing the front assemblage to the rear assemblage, a rod secured to the front assemblage and a rod secured to the rear assemblage and in alignment with said first-mentioned rod, shock absorbing means connecting said rods, and said front assemblage including a platform having said motor seated thereon.

CLIFFORD R. FRITZ.

REFERENCES CITED

The following references are of record in the file of this patent:

UNITED STATES PATENTS

| Number | Name | Date |
|---|---|---|
| 397,348 | Fay | Feb. 5, 1889 |
| 1,114,855 | Buckland | Oct. 27, 1914 |
| 1,296,563 | Simons | Mar. 4, 1919 |
| 1,377,948 | Wacker | May 10, 1921 |
| 1,408,895 | Lamoreaux et al. | Mar. 7, 1922 |
| 2,194,103 | Tibbals | Mar. 19, 1940 |

FOREIGN PATENTS

| Number | Country | Date |
|---|---|---|
| 264,716 | Germany | Sept. 27, 1913 |